United States Patent
Colbeck

(10) Patent No.: US 9,343,953 B2
(45) Date of Patent: May 17, 2016

(54) PRE-DISTORTION OF SENSED CURRENT IN A POWER FACTOR CORRECTION CIRCUIT

(71) Applicant: Power Integrations, Inc., San Jose, CA (US)

(72) Inventor: Roger Colbeck, Ottawa (CA)

(73) Assignee: Power Integrations, Inc., San Jose, CA (US)

( * ) Notice: Subject to any disclaimer, the term of this patent is extended or adjusted under 35 U.S.C. 154(b) by 273 days.

(21) Appl. No.: 14/018,954

(22) Filed: Sep. 5, 2013

(65) Prior Publication Data

US 2015/0062985 A1 Mar. 5, 2015

(51) Int. Cl.
  *H02M 7/68* (2006.01)
  *H02M 1/42* (2007.01)
  *H02M 1/00* (2006.01)

(52) U.S. Cl.
  CPC .............. *H02M 1/42* (2013.01); *H02M 1/4225* (2013.01); *H02M 2001/0009* (2013.01)

(58) Field of Classification Search
  CPC ................ H02M 1/42; H02M 1/4225; H02M 2001/0009
  USPC ................................ 323/277, 271; 363/41, 89
  See application file for complete search history.

(56) References Cited

U.S. PATENT DOCUMENTS

| | | | | |
|---|---|---|---|---|
| 5,969,962 | A * | 10/1999 | Gabor | 363/89 |
| 6,545,887 | B2 * | 4/2003 | Smedley et al. | 363/89 |
| 2005/0068796 | A1 * | 3/2005 | Morita | H02M 1/4225 363/120 |
| 2006/0158912 | A1 * | 7/2006 | Wu et al. | 363/89 |
| 2008/0002439 | A1 * | 1/2008 | Allinder | 363/21.01 |

* cited by examiner

*Primary Examiner* — Jessica Han
*Assistant Examiner* — Lorena Bruner
(74) *Attorney, Agent, or Firm* — Blakely Sokoloff Taylor & Zafman LLP

(57) ABSTRACT

An example controller includes a power factor enhancer, an on-time controller, and a switching signal generator. The power factor enhancer is coupled to generate a pre-distortion signal each half-line cycle of an ac input voltage of a PFC converter. The on-time controller ends an on-time of a PFC switch in response to a sensed PFC switch current of the PFC converter multiplied by the pre-distortion signal. The switching signal generator controls an input current waveform of the PFC converter to substantially follow a shape of an input voltage waveform by generating a switching signal in response to the on-time controller to control switching of the PFC switch. The power factor enhancer adjusts the pre-distortion signal to pre-distort the sensed PFC switch current to compensate for distortion in the input current waveform.

25 Claims, 11 Drawing Sheets

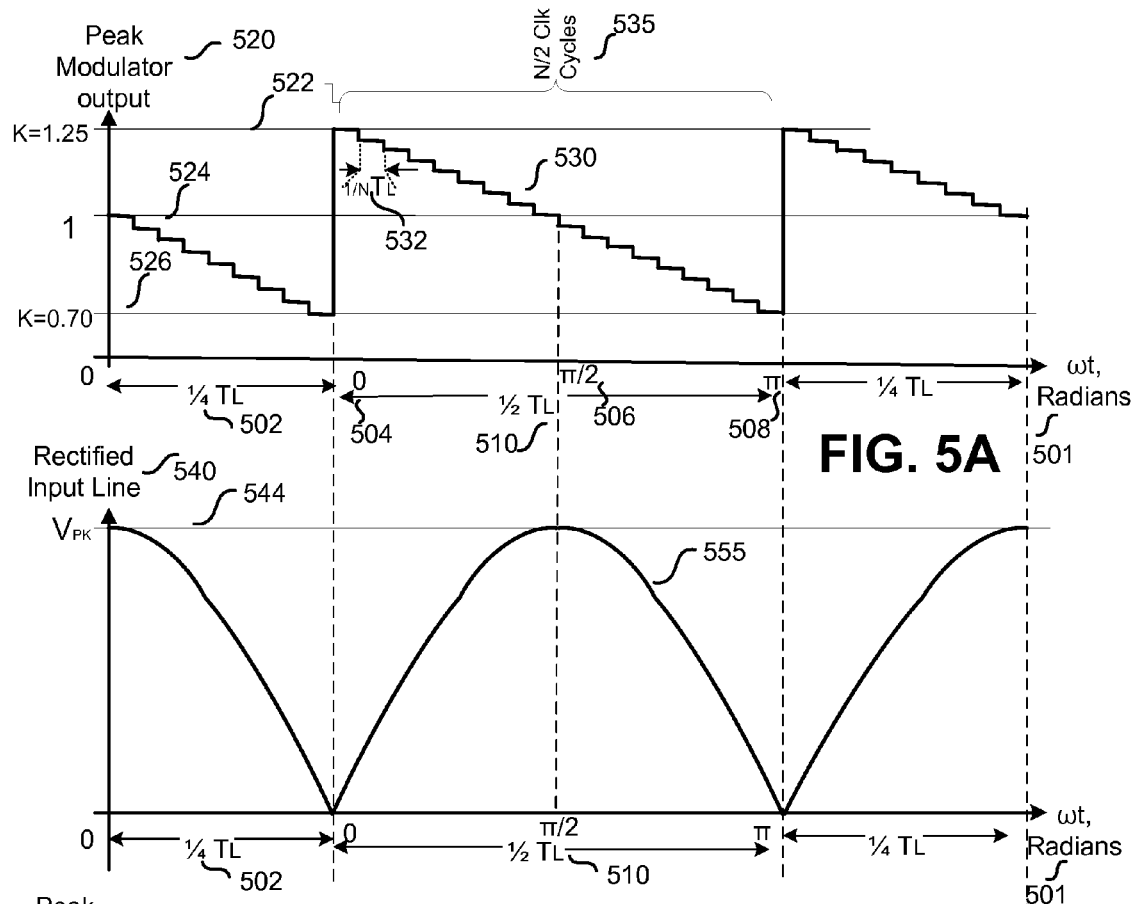
FIG. 5A
FIG. 5B
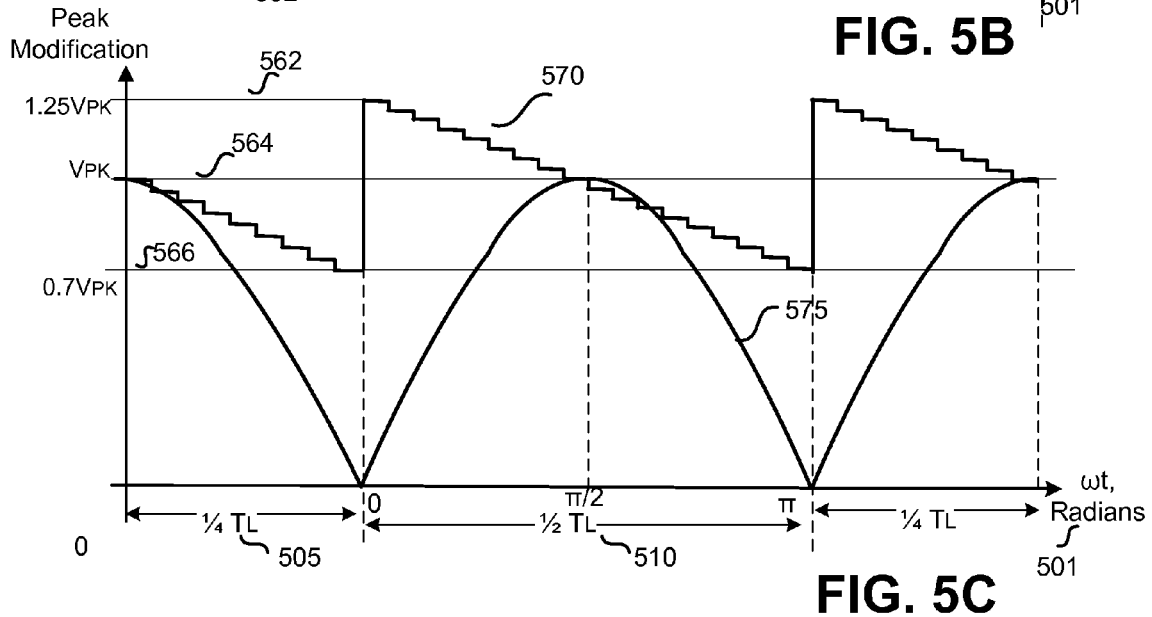
FIG. 5C

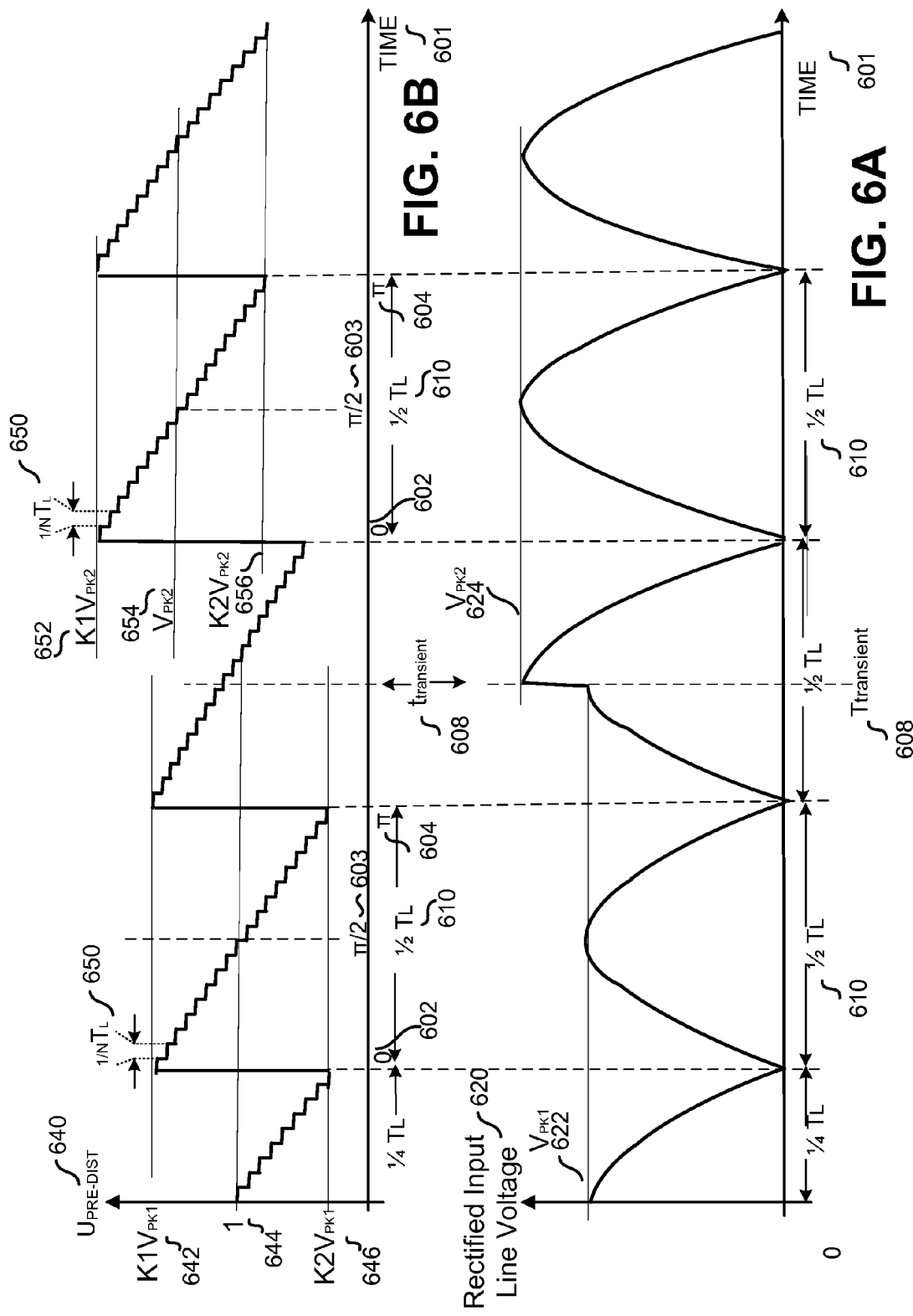

PRE-DISTORTION OF SENSED CURRENT IN A POWER FACTOR CORRECTION CIRCUIT

TECHNICAL FIELD

This disclosure relates generally to power supplies, and in particular but not exclusively, relates to controllers for switched mode power supplies with power factor correction (PFC).

BACKGROUND INFORMATION

Electronic devices use power to operate. Switched mode power supplies are commonly used due to their high efficiency, small size and low weight to power many of today's electronics. Conventional wall sockets provide a low frequency alternating current. In an off-line switching power supply an alternating current (ac) input is converted to provide a well regulated direct current (dc) output through an energy transfer element. The switched mode power supply controller usually provides output regulation by sensing the output and controlling it in a closed loop. Some off-line switching power supplies include a power factor correction (PFC) feature where the controller provides an internal current loop, as well, to control current shaping of the line current. Operation of a switched mode power supply includes high frequency switching to provide a desired output by varying the on-time, off-time or switching frequency of the switch. Typically, in pulse width modulation PWM, duty cycle is controlled, where the duty cycle is the ratio of the on-time to the total switching period.

Requirements, such as efficiency, size, weight and cost are usually taken into account when designing a switched mode power supply. A controller that controls the switching of the switched mode power supply may be designed to comply with power factor and efficiency requirements of certain regulatory agencies. For example, a conventional controller may be designed to control the switching of the switched mode power supply to provide power factor (PF) and efficiencies higher than predefined values at different load levels and at different conditions of operation (e.g., low line or high line voltages). Higher PF provides sinusoidal input current that is in phase with input voltage and contains acceptable level of low frequency harmonics (e.g., low level of Total Harmonic Distortion THD). High efficiency is also required to reduce power loss and heating at high loads while providing an efficient operation at lower loads and at no load.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 5A-5C show a variable multiplication factor that varies during each half line cycle of input line voltage, in accordance with an embodiment of the invention.

FIGS. 6A and 6B show a transient event on the input line voltage and an associated change in the variable multiplication factor, in accordance with an embodiment of the invention.

Figure 1:
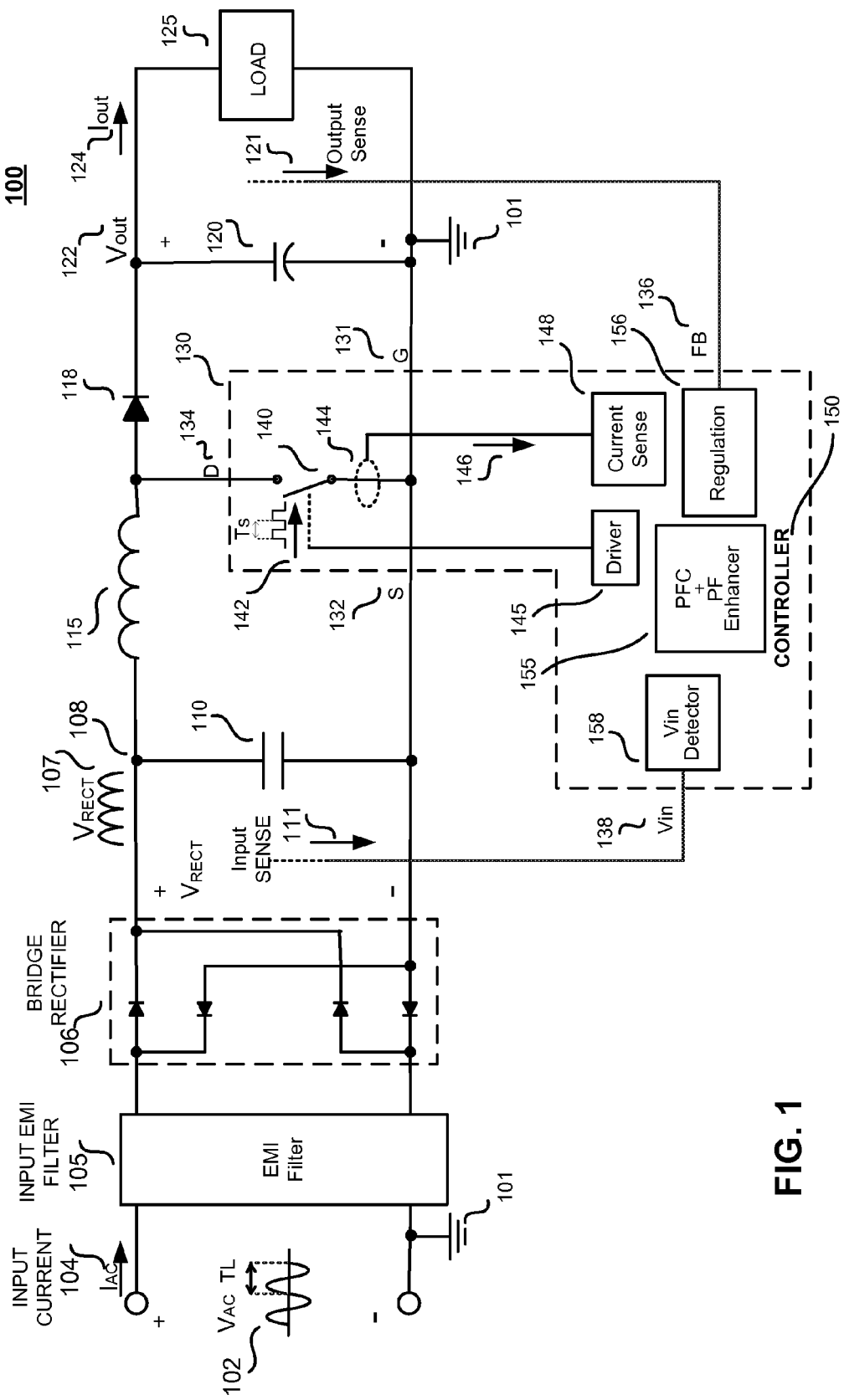
FIG. 1 is a functional block diagram illustrating an example power factor correction (PFC) converter, in accordance with an embodiment of the invention.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

DETAILED DESCRIPTION

Due to the non-linear loading that conventional switching power converters may present to the ac source, the wave shape of the current drawn from the ac source by the power supply may be non-sinusoidal and/or out of phase with the ac input voltage waveform. This leads to increased losses in the ac mains distribution system and, in many parts of the world, is now the subject of legislative or voluntary requirements that power supply manufacturers ensure the current drawn by the power supply is sinusoidal and in phase with the ac voltage waveform. Thus, embodiments disclosed herein may provide for the correction of the input current waveform. Such a correction may be referred to as power factor correction (PFC). In general, if the input ac current and voltage waveforms are sinusoidal and perfectly in phase, the power factor of the power supply is 1 (or 100%). In other words, a power factor corrected input will present a load to the ac source that is equivalent to coupling a fixed resistance across the ac source. As harmonic distortion and/or phase displacement of the input current relative to the ac source voltage increases, the power factor decreases below 1. Power factor requirements typically require power factors greater than 0.9 and may have requirements for the harmonic content of the input current waveform.

As discussed above, in the AC/DC (off-line) power converters the regulatory standards in addition to the efficiency requirements have established minimum requirements of PF (power factor) and THD (total harmonic distortion) for the performance ranking of switch mode power converters in the market (eg; Gold, Silver or Bronz). Power factor restrictions for converters with power factor correction should be satisfied in high loads as well as in low loads. It is typically much easier to provide good power factor at high loads and there are PFC converters in the market that do so. However, for the low loads (typically 20-25% or below) due to more dominant effect of input capacitive filter effect that results in current phase shift and due to parasitic or noise effect that results in higher THD of the line current, it is more difficult to achieve a high power factor.

Thus, embodiments of the present disclosure, provide for a power factor (PF) enhancer that is added to the controller of a PFC converter (e.g., a Boost PFC converter) that enhances the power factor of line current at a predefined load and input voltage (e.g., at 20% load and 230V input voltage) that may be of interest in compatibility with the PF regulatory standards.

From study and analysis of the line current distortion in a PFC converter at low load and/or high line voltage, it is observed that the rising slope of the sinusoidal input current waveform, at the first half of the half-line cycle (quarter of line cycle, e.g.; $0<\omega t<\pi/4$), is distorted by being pulled up. At the second half of the half-line cycle (quarter of line cycle, e.g.; $\pi/4<\omega t<\pi/2$) the falling slope of the input current waveform is distorted by being pushed down. Accordingly, embodiments of the present disclosure provide for the application of a controlled pre-distortion on the sensed current (which is used by the PFC engine to process the reference current) in an opposite direction to compensate and improve the power factor PF and total harmonic distortion THD of the line current waveform. The pattern/algorithm of such the pre-distortion on the sensed current is so that it would be pulled up during rising slope at the first half of the half-line cycle (quarter of line cycle, e.g.; $0<\omega t<\pi/4$) and pushed down during the falling slope at the second half of the half-line cycle (quarter of line cycle, e.g.; $\pi/4<\omega t<\pi/2$). The distortion on the current waveform is a function of load level (depends on the load level; e.g., current waveform distortion in 40% load is different from 20% load). Thus, embodiments of the present disclosure may provide for pre-distortion that is adjusted to compensate for a predefined specific load level.

In one example of a PFC controller, the current reference is modified by the detected peak of the line voltage and is responsive to the value of peak voltage (proportional to the square of peak value), where the peak voltage is normally constant throughout the line cycle. An example pre-distortion manipulates the detected peak of the line voltage by multiplying it by a variable multiplication factor that is non-constant throughout the line cycle and is a ramped down function of the line half cycle phase angle. This pre-distorts the reference current to compensate the current waveform distortion for a certain region of load current and line voltage (as an example around 20% load and 230V line voltage).

FIG. 1 is a functional block diagram illustrating an example PFC converter 100, in accordance with an embodiment of the invention. The illustrated example PFC converter 100 is an off-line PFC Boost switching power converter that receives AC sinusoidal input voltage $V_{AC}$ 102 with the line period $T_L$ and draws an input current $I_{AC}$ 104 from the line. PFC converter 100 includes an input EMI filter block 105, a bridge rectifier 106 providing a full-wave rectified voltage $V_{RECT}$ 107 at terminal 108 to the Boost stage.

Input capacitor 110 is coupled across bridge rectifier 106 to bypass and filter out the high frequency current from switching device 140. For applications without power factor correction (PFC) the input capacitor 110 is large enough such that a dc voltage is to be applied to inductor 115. However, for power converters with PFC, input capacitor 110 with a small capacitance value is utilized to save the line sinusoidal wave shape and allow the voltage applied to inductor 115 to substantially follow the rectified sinusoidal voltage $V_{RECT}$, specially for larger loads.

In example converter 100 of FIG. 1, the boost stage consists of a boost inductor 115, an output rectifier 118, and a switching circuit 130 that includes a switching device 140 and a controller 150. The switching device 140 and controller 150 may be included in an integrated circuit. Output rectifier 118 in FIG. 1 is coupled to inductor 115 and is exemplified as a single diode (boost diode). However, in some embodiments the rectifier 118 may be a transistor used as a synchronous rectifier.

PFC converter 100 provides output power to the load 125 from an unregulated input voltage that may be an ac line voltage, such as provided from a conventional wall outlet and in one embodiment, switching device 140 may be a transistor such as a metal-oxide-semiconductor field-effect transistor (MOSFET).

Both the output capacitor 120 and the load 125 in FIG. 1 are coupled to the rectifier 118. An output is provided to the load 125 that may be either a regulated output voltage $V_O$ 122, regulated output current $I_O$ 124, or a combination of the two.

Output capacitor 120 applies a filtered DC output voltage Vo 122 on the load 125 with an output/load current Io 124 to provide the load power. For the non-isolated boost converter of FIG. 1 the reference ground 101 is common at the input and output of the converter.

PFC converter 100 further comprises controller 150 with circuit blocks to regulate the output and provide PFC at the input. Controller 150 in the illustrated simplified example of FIG. 1 may include multiple internal blocks. The current sense block 148 receives switch sensed current 144 to process the current sense signal 146 to control switching of switching device 140 for current shaping and over-current protection.

A feedback circuit (not shown) may be coupled to the output of PFC converter 100 to transfer output sense signal 121 (e.g., through resistive divider) and produce a feedback signal at FB terminal 136. In one embodiment, output sense signal representative of output voltage 122 may generate either a current signal or a voltage signal. Regulation block 156 receives the feedback signal via the FB terminal and based on the input/output information received to controller 150, controls switching of switching device 140 through the driver block 145 and driver output signal 142, to provide a regulated DC output voltage from a non-regulated input voltage. Input voltage detector 158 receives input voltage signal 138 at Vin terminal of controller from the input sense signal 111 and may detect the input line peak value and zero-crossing to provide the required reference for the PFC and PF Enhancer 155.

In one embodiment, controller 150 generates switching signal 142 to control the switching of switch device 140 to regulate the output of switching power converter 100 as well as providing power factor correction in response to the ac input voltage signal and current sense.

The controller terminals S 132 (representing source in example of a MOSFET switching device 140) and terminal G 131 (representing reference ground of the controller) are coupled to the power ground reference 101 of the converter. It is recognized that a voltage signal and current signal each may contain both a voltage component and a current component. However, the term "voltage signal" as used herein means that the voltage component of the signal is representative of the relevant information. Similarly, the term "current signal" as used herein means that the current component of the signal is representative of the relevant information. By way of example, the feedback signal to FB terminal 136 may be a current signal having a voltage component and a current component, where it is the current component that is representative of output sense 121.

In one example, controller 150 and switching device 140 may be implemented and manufactured as a monolithic or hybrid integrated circuit IC for a compact and efficient operation or may be implemented with discrete electrical components or a combination of discrete and integrated components and may include a high potential side terminal D 134 of the switching device 140 (representing a drain in the example of a MOSFET switching device).

Figure 2A:
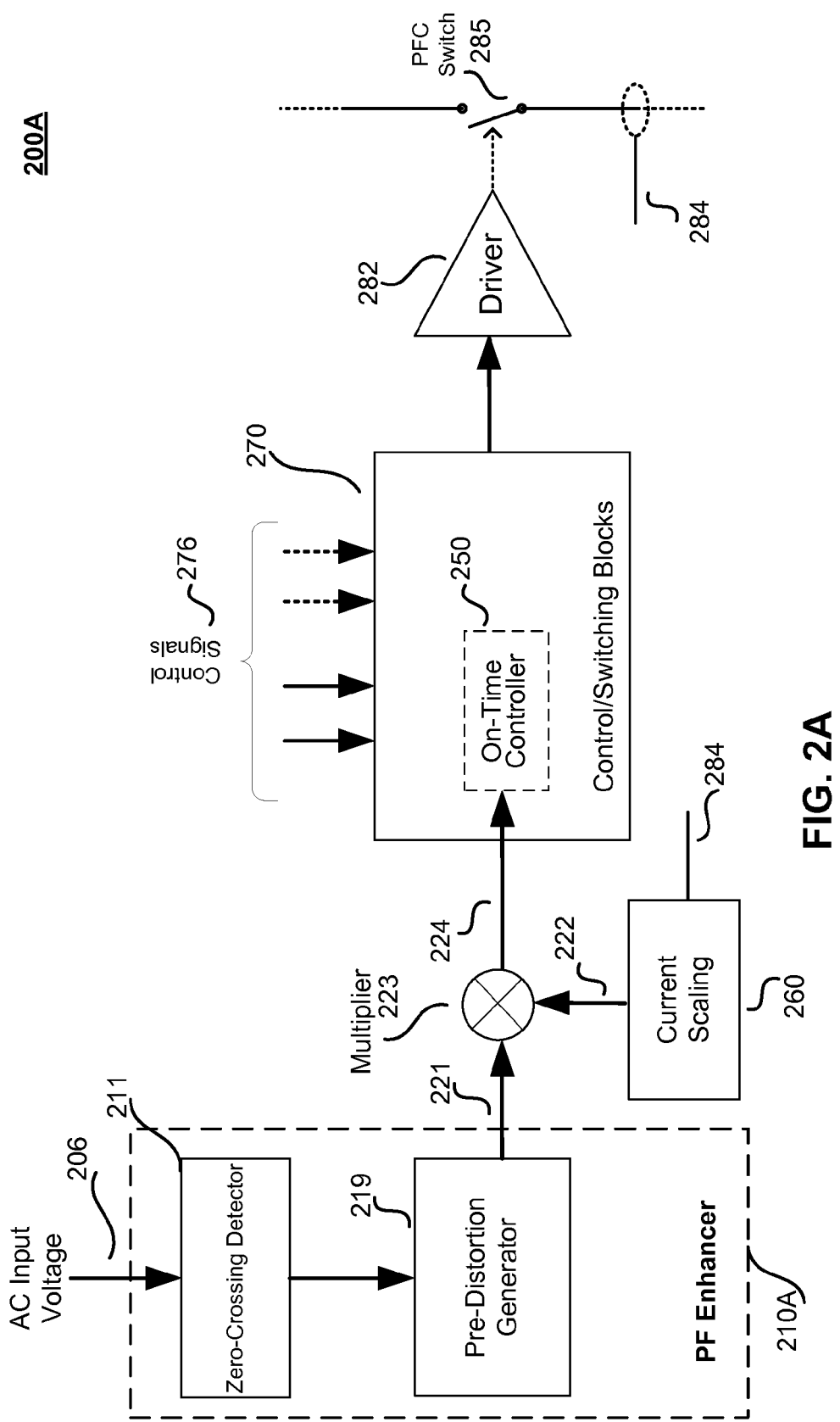
FIG. 2A is a functional block diagram illustrating an example controller for use in a PFC converter, in accordance with an embodiment of the invention.

FIG. 2A is a functional block diagram illustrating an example PFC converter 200A, in accordance with an embodiment of the invention. The PF Enhancer block 210A receives at input 206 (e.g., a scaled down signal of the rectified or AC input line voltage) and detects the input line zero-crossing by way of zero-crossing detector 211, which generates a zero-crossing signal that is used by pre-distortion generator 219 to generate a pre-distortion signal 221 at each half line cycle. The pre-distortion signal 221, at each half line cycle, would be modulated on the sensed and scaled current signals 222 through the multiplier 223. The sensed current 284 in a PFC converter could be the boost inductor current sensed at the input return line or, as shown in the example of FIG. 2A, could be the boost power switch current sensed through an internal sense FET or on an external sense resistor series with the boost power switch. The sensed current 284 is input into an scaling block 260 which generates a current shaping reference for the input line current to follow the sinusoidal waveform of the input line voltage. At each load and line condition (specifically when input line is in high level, eg; typically 230 Vrms or above 160 Vrms, and load is at low level, eg; below 25%) the pre-distortion signal 221, modulated on the sensed and scaled current signal 222, should be imposed so that it would compensate in an opposite direction for the distortion that could otherwise happen at that particular load and line condition. In one example of a boost converter with a PFC controller a typical high total harmonic distortion (high THD factor) may happen on the line input current at high input line voltage (eg; 230Vac) and light load (eg; <25% load).

Figure 2B:
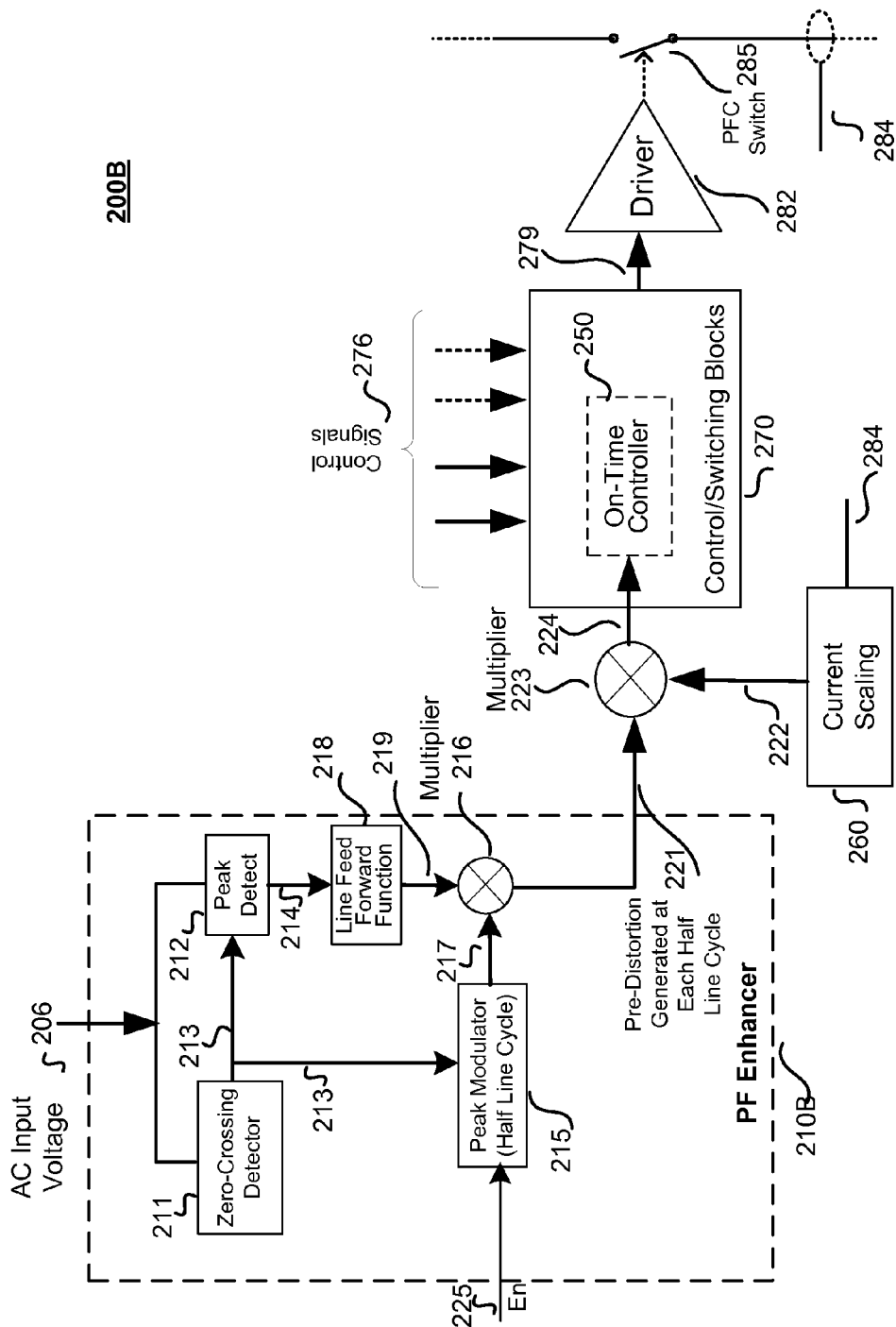
FIG. 2B is a functional block diagram illustrating an example implementation of a power factor (PF) enhancer, in accordance with an embodiment of the invention.

FIG. 2B is a functional block diagram illustrating an example implementation of a PF enhancer 210B, which utilizes the peak value of input line voltage for the switching on-time control. In the embodiment of FIG. 2B, the pre-distortion signal of the PF Enhancer may be modulated on the input line peak signal to compensate for the high total harmonic distortion (high THD factor) and low power factor of line current that occurs under certain load and line conditions.

In FIG. 2B the PF Enhancer 210 receives the rectified/AC line cycles signals 206. Input signal 206 is coupled to zero-crossing detector 211 as well as to peak detector 212. The input line signal 206 is used by zero-crossing detector 211 to detect zero-crossing of line cycles where the zero-crossing signal 213 would be used by peak detector 212 to generate the peak value signals 214. To keep the loop gain constant in PFC controller a line feed forward function 218 may be applied on the peak value signals 214. In one example the required line feed forward function 218 may be a square function or a piece-wiselinear function that simulates a second order parabolic function.

The zero-crossing signal 213 would also be used in peak modulator block 215 to generate a peak modulator function 217 at each half line cycle (between two consecutive zero-crossing signals). In one example the peak modulator function 217 at each half line cycle may be a sloped down linear or non-linear function that is tailored to compensate the required reshaping of the line current waveform to achieve an improved sinusoidal current waveform with reduced total harmonic distortion and higher power factor. The peak modulator function 217 at each half line cycle would then modulate on the signal 219 through multiplier 216. Signal 219 is the line feed forward function implied on the peak signal 214 detected by block 212 from the rectified/AC line cycles signals 206 where the output of multiplier 216 forms the pre-distortion signal 221 that is repeatedly (periodically) generated at each half line cycle.

In a typical distortion of input line current that may occur at high line (eg; 230Vac) and low/light load (~20% of rated) operating condition, the line current in comparison to the sinusoidal waveform of input voltage is tending to tilt up at the first half of line half cycle (quarter of line cycle) and tilt down at the second half of line half cycle which results in a high THD in current waveform and a poor power factor. The pre-distortion function 221 is such that when multiplied through multiplier 223 to the current signals 222 (that is sensed current 284, scaled through block 260), would result in the reshaped current waveform 224 which compensates in the opposite direction of original distortion; i.e. it will act to pull up the line current waveform at the first half of line half cycle (quarter of line cycle) and pushes it down at the second half of line half cycle (quarter of line cycle). When PF Enhancer 210 is not enabled (eg; in low line and/or high load operation such that current distortion, THD is low and PF doesn't need improving), signal 221 is simply signal 219 that is the peak signal 214 imposed by the line feed forward function 218. The on-time controller 250 in the switching control block 270 of the PFC controller receives the modified current signal 224 and in combination with other control signals 276 and by functionality of other control blocks in PFC controller (that will be explained in FIG. 3) outputs the switching signal 279 to the driver 282 to turn PFC power switch 285 On & Off to control transfer of energy to the power converter output.

Figure 2C:
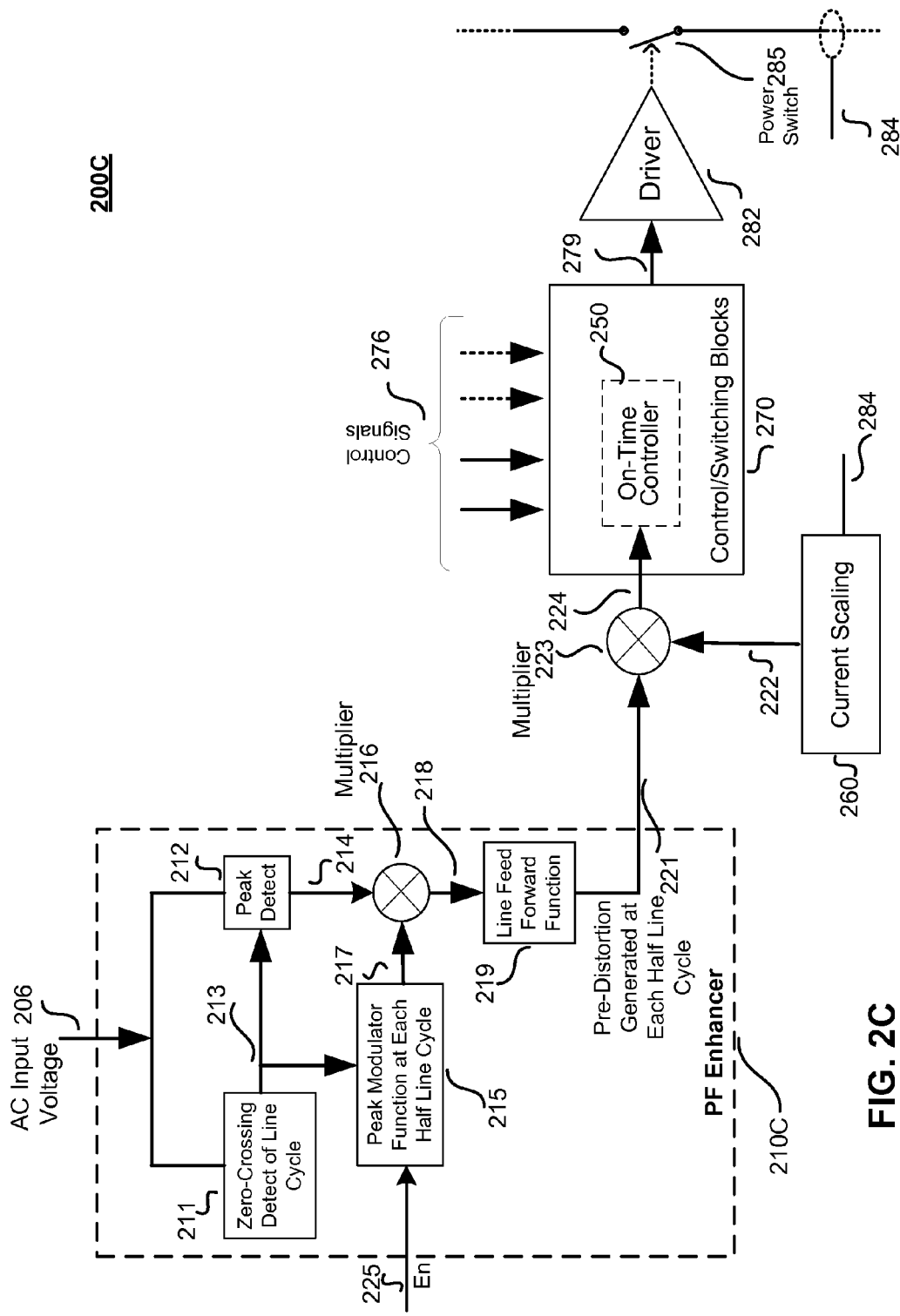
FIG. 2C is a functional block diagram illustrating another example implementation of a PF Enhancer in accordance with an embodiment of the invention.

FIG. 2C is a functional block diagram illustrating another example implementation of a PF enhancer 210C where the rectified or AC line signal 206 (in one example the scaled rectified/AC sensed input voltage) is processed in Zero-Crossing detector 211 and by peak detector 212 as described in FIGS. 2A & 2B). By receiving the zero-crossing signal 213 the Peak Detect block 212 generates Vpk signal 214 and the peak modulator block 215 generates the peak modulator function 217 that, in comparison to implementation option in FIG. 2B, are first multiplied through multiplier 316 and the result 218 is then exposed to the line feed forward function 219 to generate the pre-distortion signal 221 at each half line cycle at output 221 of the PF Enhancer 210C. The pre-distortion signal 221 at each half line cycle is then imposed on the scaled sensed current signal 222 that is generated by the scaled sensed current block 260 upon receiving the sensed current 284 (that in one example could be through a sense FET or a sense resistor). The pre-distorted current signal 224 could be utilized by the on-time controller 250 to control switching on-time and compensate for the current distortion and improving the power factor at high line and/or low load operating condition. If the PF Enhancer feature is not enabled through the enable signal "En 225" (eg; at low line and/or high load operating condition that PF naturally is high) then signal 224 received by the on-time ramp block 250 is simply the peak detect signal 214 imposed (modulated) by the line feed forward function 219 and multiplied to the scaled/sensed current signal 222. The switching control unit (block) 270 that is part of a PFC controller IC, in one example, may include multiple required blocks and receive some control signals 276 to generate switching signal 279 that through driver 282 turns PFC power switch 285 on and off to control transfer of energy to the power converter output.

Figure 3:
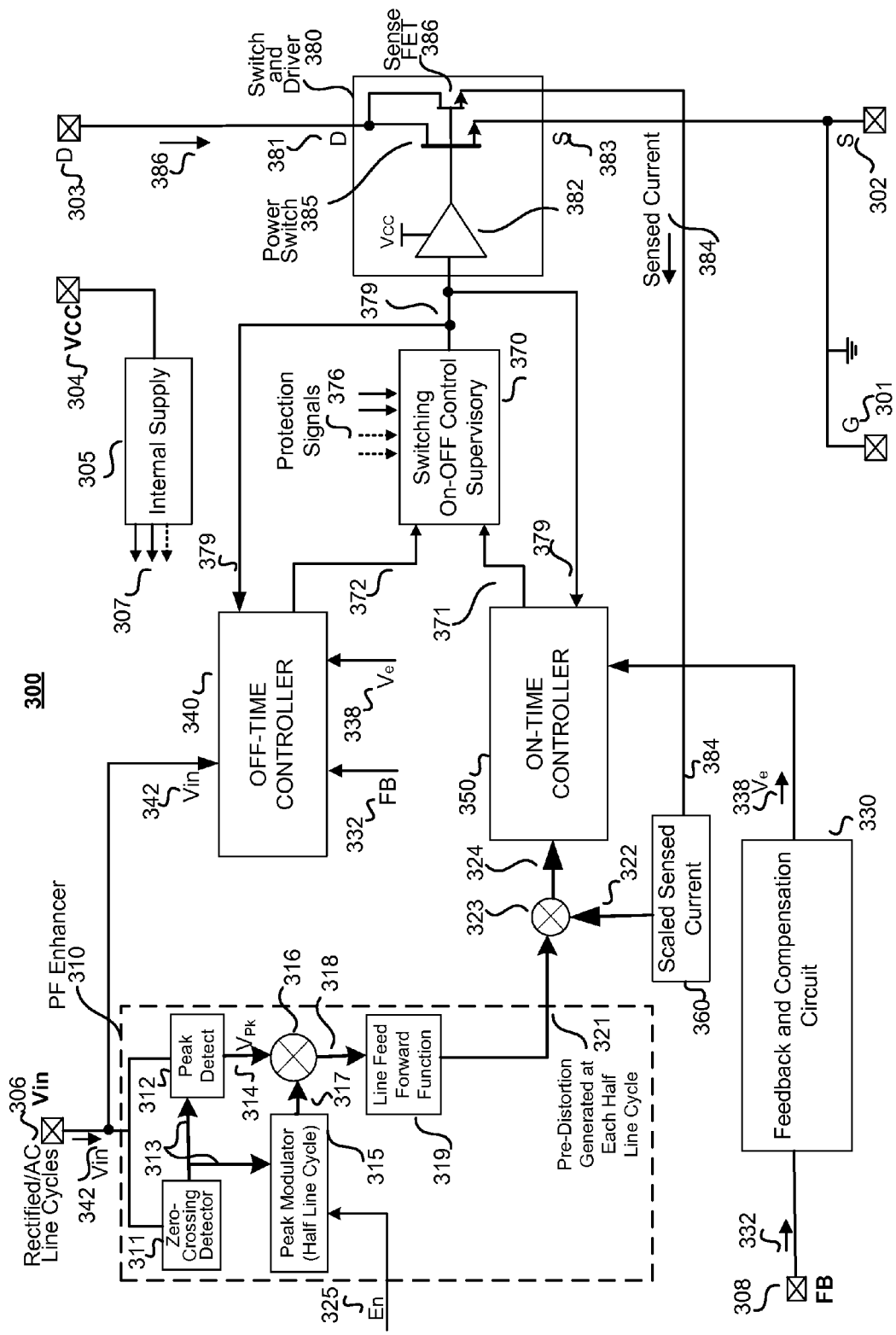
FIG. 3 is a functional block diagram illustrating an example controller, in accordance with an embodiment of the invention.

FIG. 3 shows a functional internal block diagram of an example PFC controller that utilizes PF Enhancer 310. The rectified or AC line signal (that in one example is the scaled rectified/AC sensed input voltage), is received at controller pin 306 and is processed by zero-crossing detector 311 and by peak detector 312 as described in FIGS. 2A-C. By receiving the zero-crossing signal 313, peak detector 312 generates Vpk signal 314 and the peak modulator block 315 generates the peak modulator function 317 that is similar to example implementation of FIG. 2C. Multiplier 316 generates result 318 which is then exposed to the line feed forward function 319 to generate the pre-distortion signal 321 at each half line cycle at output of the PF Enhancer. The pre-distortion signal 321 at each half line cycle is imposed on scaled sensed current signal 322 that is generated by scaled sensed current block 360 by receiving the sensed current 384 that in this example is through a sense FET 386 combined with the power switch 385. The pre-distorted current signal 324 is then used by the on-time controller 350 to compensate for the current distortion and improve the power factor at high line and/or low load operating condition. The enable signal "En 325" in one example is coupled to the Peak Modulator block 315 to activate the PF Enhancer function at high line and/or low load to improve the power factor. If the PF Enhancer feature is not activated through the enable signal "En 325" (eg; at low line and/or high load operating condition) then signal 324 received by the on-time controller 350 is simply the peak detect signal 314 imposed by the line feed forward function 319 and multiplied to the scaled/sensed current signal 322.

In one embodiment, output regulation of the PFC converter is accomplished through receiving a feedback signal 332 from the output of the converter on FB pin 308 that through the feedback and compensation circuit block 330 generates a voltage error signal Ve 338 that is utilized by the controller to control transfer of energy and regulate the output. The on-time controller 350 by receiving signal 324 from multiplier 323 and voltage error signal Ve 338 may generate on-time signal 371. The off-time controller 340 by receiving signal Vin 342 (rectified/AC line cycles) from pin Vin 306, feedback signal FB 332 from pin FB 308 and voltage error signal Ve 338 may generate off-time signal 372. The switching on-off control supervisory block 370 is coupled to the on-time controller 350 and off-time controller 340 which provide on-time signal 371 and off-time signal 372 respectively to the switching on-off control supervisory block 370. Switching signal 379 is generated by the switching on-off control supervisory block 370 through on-time signal 371, off-time signal 372 and considering the protection signals 376.

The rising edge and falling edge of the switching signal 379 could also provide resetting signal for the on-time controller 350 and off-time controller 340 respectively.

The switching signal 379 through driver 382 commands On-Off control of the power switch 385 between Drain D 381 and Source 383 terminals coupled to the external pins of the IC, D 303 and S 302 respectively, where the source pin 302 is coupled to the ground pin G 301. It is appreciated that in one example the power switch 385 and driver 382 (switch and driver unit 380) may be integrated as a monolithic or hybrid structure in the controller IC.

The supply to power different blocks of the controller 300 is provided through the internal supply block 305 that may be coupled to an external supply through the controller pin Vcc 304 and with the required under/over voltage protection provides supply links 307 to multiple internal blocks of the controller 300.

Figure 4A:
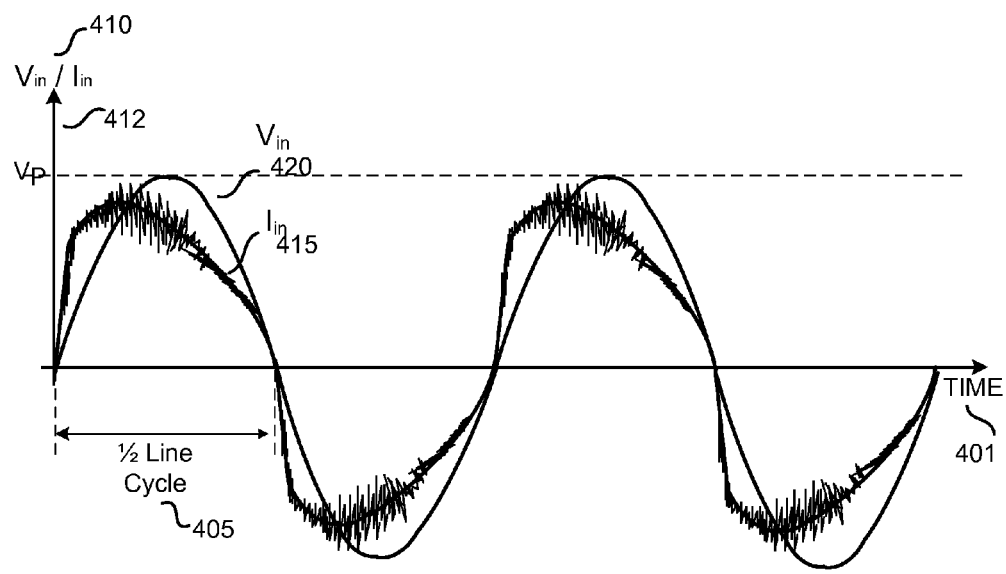
FIGS. 4A and 4B show input line voltage and current waveforms without pre-distortion of the input current.

FIG. 4A shows an example of the captured line voltage and line input current in a high line voltage and/or low load situation (in one example could be 230 V input voltage and 20-25% output load) when the PF Enhancer is not enabled (i.e., disabled) and the EMI/switching noise is not filtered out. As shown, even with the PFC operating, the input current waveform is distorted, when at low current levels, due to the impact of the bridge capacitor and the EMI filter, even though the sensed current will be sinusoidal. The vertical axis 412 shows the instantaneous values of the input line voltage and input current and the horizontal time axis 401 presents 2 line cycles (4 line half cycles 405) of the input line sinusoidal voltage 420 and the input line current 415 for an example of boost converter at high line voltage and about 20% of the rated current. As shown, the input current waveform is distorted due to the current reference distortion at low current levels and due to the capacitive effect of the input filter.

Figure 4B:
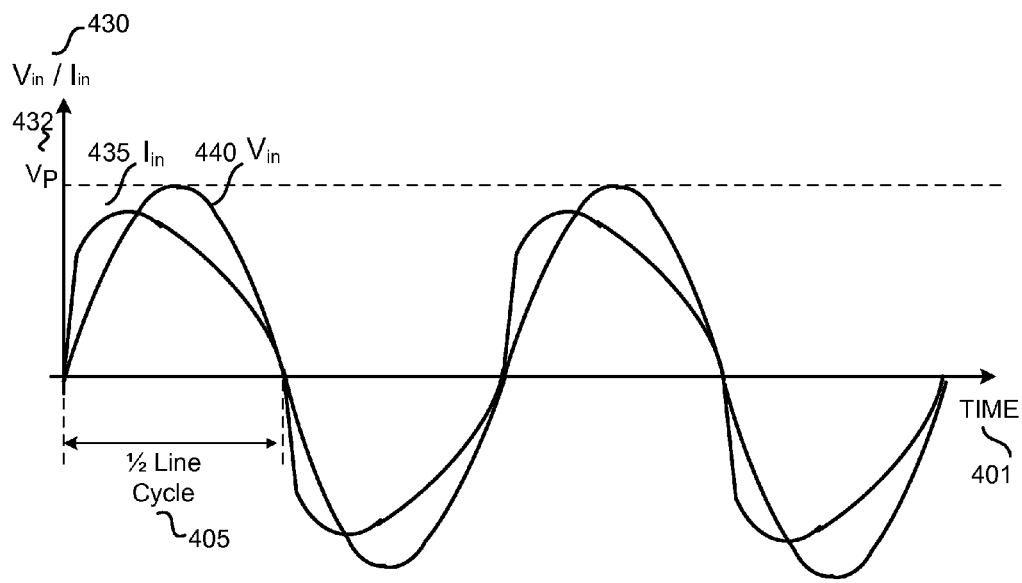

FIG. 4B is similar to that of the FIG. 4A, with PF Enhancer not enabled but with the assumption that the switching noise is completely filtered out by an ideal EMI filter (to give a better illustration of high total harmonic distortion and low power factor). On the vertical axis 432 the distortion of the input line current waveform 435 is compared to the ideal sinusoidal waveform of input line voltage 430. The horizontal time axis 401 presents 2 line cycles (half line cycle 405) for a line frequency of 50 or 60 Hz and time period T of 20 or 16 ms respectively. The line current distortion shows that during rising slope at the first half of the half-line cycle (quarter of line cycle, e.g.; $0<\omega t<\pi/4$) current, that is expected to follow the line voltage, is distorted by being pulled up and at the second half falling slope of the half-line cycle (quarter of line cycle, e.g.; $\pi/4<\omega t<\pi/2$) the current waveform, instead of following the line voltage, is distorted by being pushed down.

Figure 4C:
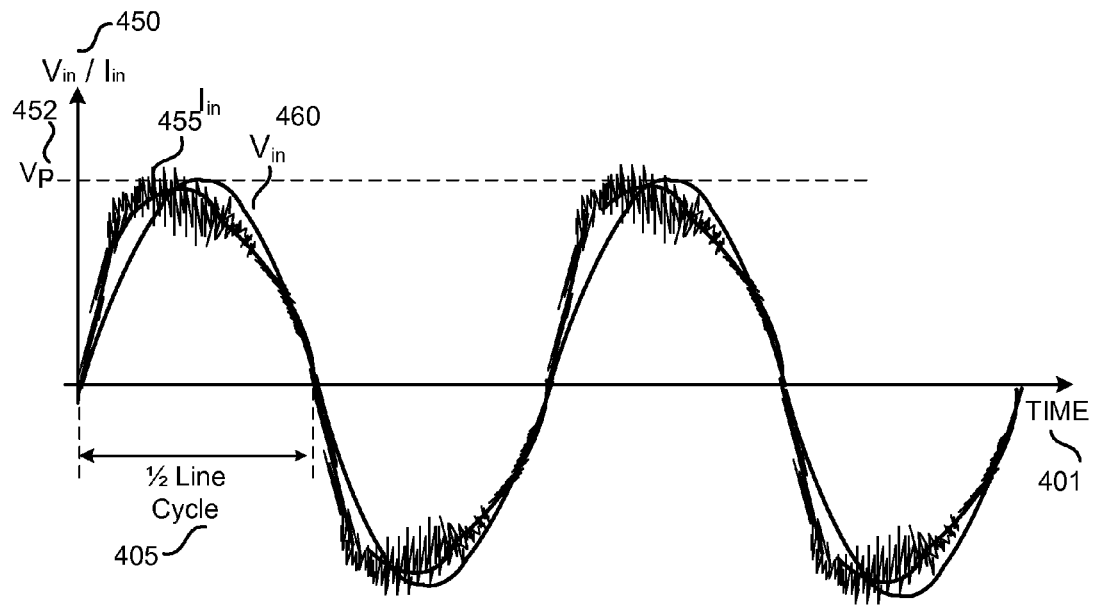
FIGS. 4C and 4D show input line voltage and current waveforms with pre-distortion of the input current, in accordance with an embodiment of the invention.

FIG. 4C is similar to that of FIG. 4A, except with PF Enhancer enabled and the EMI/switching noise not filtered out. The vertical axis 452 shows the instantaneous values of the input line voltage and current and the horizontal time axis 401 presents 2 line cycles (half line cycle 405) of the input line sinusoidal voltage 460 and the input line current 455 that even though the high frequency switching/EMI noise is present (not filtered out), it shows that by enabling the PF Enhancer feature the low frequency harmonic distortion is reduced and power factor is improved.

Figure 4D:
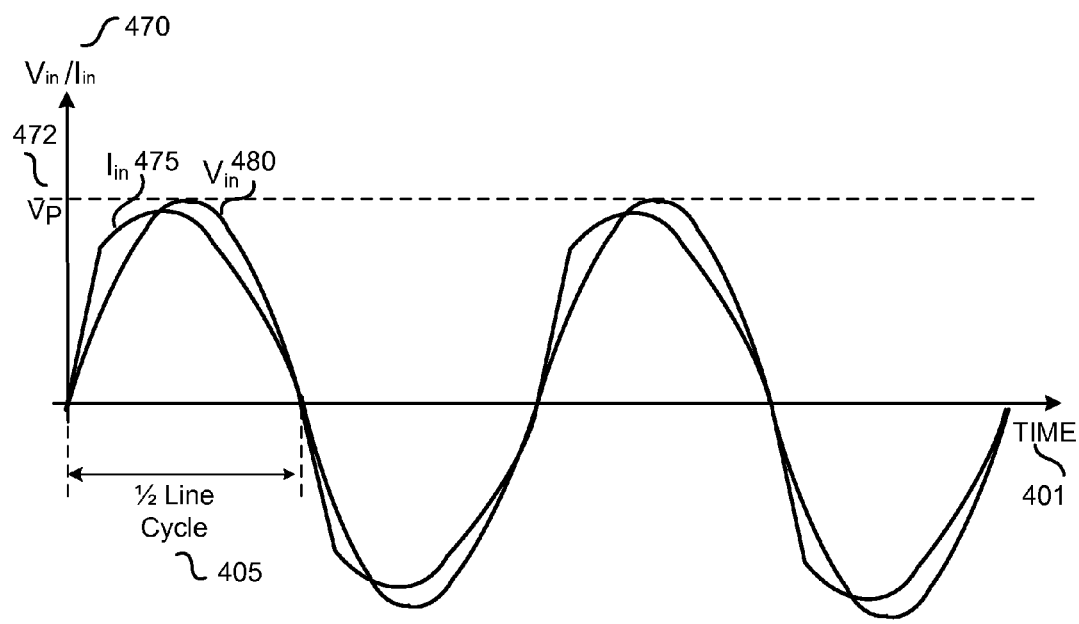

FIG. 4D is similar to that of FIG. 4C, with PF Enhancer enabled and the high frequency EMI/switching noise filtered out. The vertical axis 472 shows the instantaneous values of the input line voltage and current and the horizontal time axis 401 presents 2 line cycles of the input line sinusoidal voltage 480 and the input line current 475 that by high frequency switching/EMI noise filtered out. As shown in FIG. 4D, the enabled PF Enhancer has lowered the low frequency harmonic distortion and has improved the PF/THD through reversing the effect of distortion by tilting forward the distorted waveform of the line current compared to FIG. 3 by (through) pushing down the first half of the half-line cycle (rising slope during quarter of line cycle, e.g.; $0<\omega t<\pi/4$) and by pulling up the second half falling slope of the half-line cycle (quarter of line cycle, e.g.; $\pi/4<\omega t<\pi/2$).

FIGS. 5A-5C show a full wave rectified sinusoidal input line voltage waveform with the basic concept of a ramp function implementation used to generate the variable multiplication factor (e.g., output of peak modulator 215) and resulting pre-distortion signal, in accordance with an embodiment of the present disclosure. In each switching cycle, the peak value detected in the last half line cycle is used to generate a reference for using in the on-time controller 350 (FIG. 3) In FIG. 5A the peak modulator output 520 is a stepwise ramp down function 530 that during a half-line cycle 510 at a zero-crossing of the half-line cycle ωt=0 (radiant) starts from K>1 (in one example 1.25, 125%) and drops down to K=1, 524 at ωt=π/2 and at the end of line half cycle, ωt=π it drops to K<1 (in one example 0.7, 70%). Although, FIG. 5A illustrates a stepwise sloped down ramp (decrementing) function, other embodiments may include an analog linearly decreasing function to generate the multiplication factor. In a digital implementation of the variable multiplication factor there may be N drop steps (digital clock cycles) per each line cycle (or N/2 clock cycles 535 per each line half cycle 510), wherein each step time interval is $(1/N)T_L$ 532.

In one example the mathematical analog equation of the ramp down peak modifier function 530 at each half line cycle 0>ωt>π can be introduced by: K1-(2/π)(K1-1).ωt; Wherein the maximum value at ωt=0 is K1, it becomes 1 at ωt=π/2 and at ωt=π drops to (2-K1). In one embodiment K1=1.25.

FIG. 5B shows the line full-wave rectified input line voltage 540 with a peak value $V_{pk}$ 544. The horizontal time axis is the same as FIG. 5A with the similar labels. FIG. 5C illustrates a pre-distortion signal 570 of the line full-wave rectified half cycles during each half-line cycle 575 where the pre-distortion signal has a value of $K1*V_{pk}$ at phase angle ωt=0, such that the detected line voltage peak value is multiplied by 1.25 (e.g., $1.25*V_{pk}$). The pre-distortion signal then drops down to $V_{pk}$ 564 at ωt=π/2 and then at the end of line half cycle, ωt=π it drops to $0.7*V_{pk}$.

Thus, embodiments of the present disclosure manipulates the detected line voltage peak value through a function used to define a variable multiplication factor and using it at each half-line cycle to pre-distort the input current waveform to improve PF and THD.

FIGS. 6A and 6B illustrate a transient condition on the input line voltage and the consequential fast response on the pre-distortion signal. FIG. 6A shows several half cycles of the rectified input line voltage 620 (vertical axis) versus time 601 (horizontal axis) with half-line cycle time intervals of "½$T_L$" 610, wherein $T_L$ is the time period of the line sinusoidal voltage. A fast line transient event around peak at time $t_{transient}$ 608 increases the peak of sinusoidal voltage in a fast transient from $V_{PK1}$ 622 to $V_{PK2}$ 624. As could be observed on FIG. 6B, the new peak value detected at time $t_{transient}$ 608 would result in a proportional offset on the pre-distortion signal 640 in the next (following) half-line cycles with a fast response.

In this example, FIG. 6B shows a digital/sampled-analog implementation (stepwise function) of the pre-distortion signal 640. The vertical axis is the magnitude of the pre-distortion signal 640 that resets at each zero cross 602 and starts from a maximum value of $K1*V_{PK1}$ 642 (K1>1, in one example K1=1.25), and linearly decreases with N=32 steps per line cycle $T_L$ (or N=16 steps per half-line cycle $T_L/2$). At line phase angle of ωt=π/2, the pre-distortion signal has dropped to 1 (e.g., value 644) and eventually drops at the end of line half cycle (ωt=π) falls to $K2*V_{PK1}$ (K2<1, in one example K2=0.7). At time $T_{transient}$ 608 the line voltage peak value has changed from $V_{PK1}$ 622 to $V_{PK2}$ 624 and so in the next half-line cycle the value of the input voltage signal is updated. Thus, the value of the pre-distortion signal 640 would be shifted up (by an offset due to the peak value change) starting from a maximum value $K1*V_{PK2}$ (e.g., K1=1.25), and then linearly dropping (with same N=16 steps per half-line cycle $T_L/2$) so that at line voltage ωt=π/2 the value of the pre-distortion signal drops to $V_{PK2}$ (labeled 654) and finally at the end of the line half cycle (ωt=π) falls to $K2*V_{PK2}$ (e.g., K2<1, in one example K2=~0.7).

The selection of steps and number of steps depends on implementation resources such as the available semiconductor area.

Figure 7:
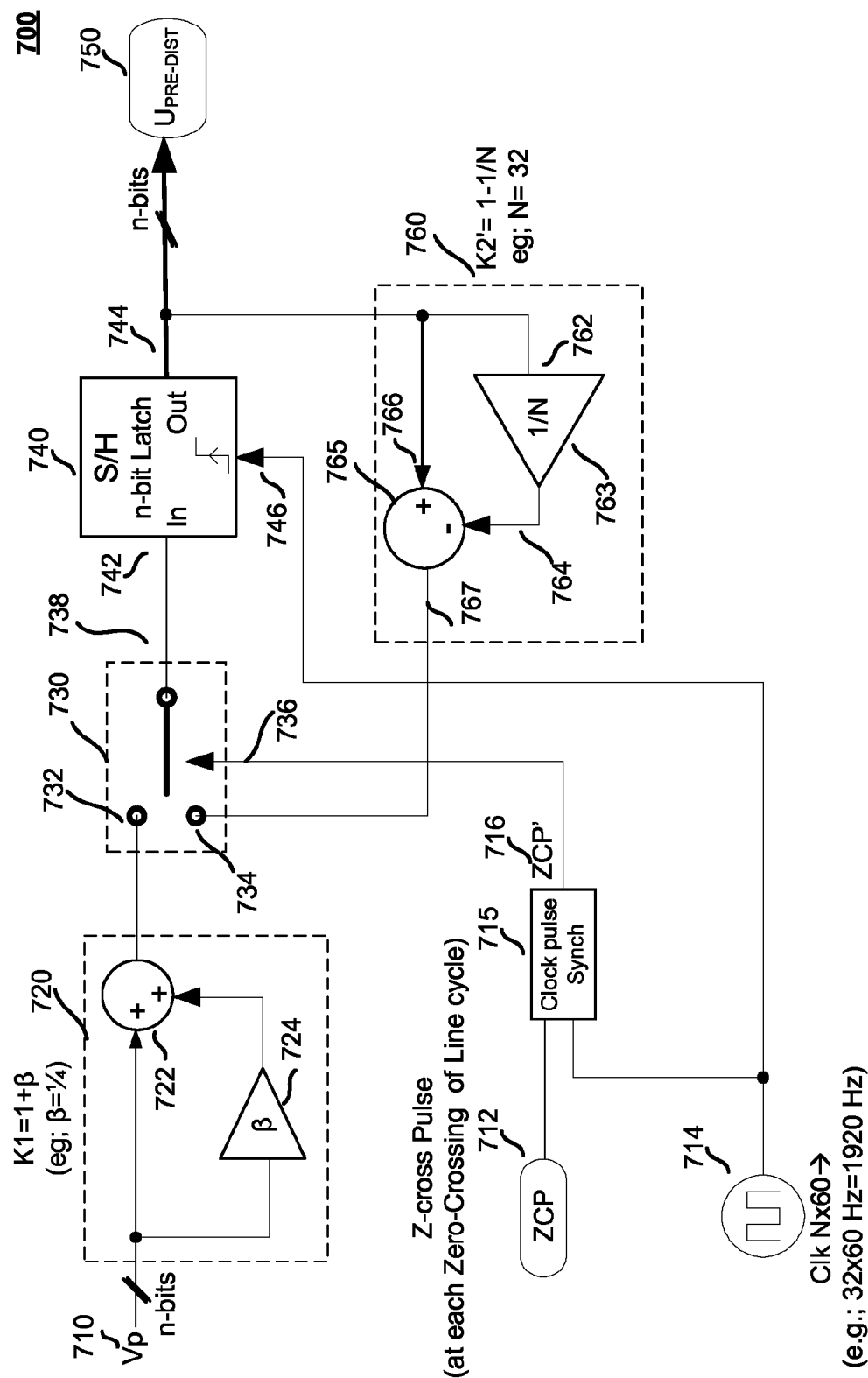
FIG. 7 is an example illustrating logic blocks of digital implementation of the power factor enhancer.

FIG. 7 shows a functional block diagram illustrating an example power factor enhancer 700, in accordance with an embodiment of the present disclosure. Power factor enhancer 700 is one possible implementation of PF enhancer 155 of FIG. 1. In this example wherein pre-distortion is applied through the peak value of line input voltage, the input voltage signal is coupled to terminal 710 to provide the peak value detected from the last cycle. The peak value is provided to the input 722 of buffer 720 with a gain K1>1 (K1=1+β). In one example K1=1.25 (β=¼) which means 125% of the last cycle buffered peak appears at output of summer 722 and couples to terminal 732 of the selector switch 730. At each zero-crossing of the line cycle, the zero-crossing detector (e.g., see FIG. 2A, 211) in the controller generates a zero-cross pulse ZCP 712 that after synchronization with clock pulse 714 (in one example at rising edge of clock pulse 714) through the clock pulse synchronization block 715 generates adjusted zero-cross pulse ZCP' 716. The adjusted zero-cross pulse ZCP' 716 is coupled to the selector switch control terminal 736 to couple terminal 732 to output terminal 738. The buffered peak value with gain K1=(1+β)>1 is applied to input terminal 742 of the Sample and Hold n-bit latch unit 740 and is sampled at a rising edge of a clock signal 714 received through terminal 746 to be held until next clock cycle (next tick of the clock).

Clock signal 714 in one example could contain 32 ticks in each 60 Hz time period of line cycle which gives a clock frequency of 32×60=1920 Hz. The sampled value at output 744 of the Sample and Hold unit 740 is then provided as a first value of the pre-distortion signal 750. The first value at output 744 of the Sample and Hold unit 740 is then applied to an input of a second buffer 760 having a gain K2' of value (1−1/N) and fed back in closed loop from an output of second buffer 760 to the terminal 734 of the selector switch 730. After the zero-cross pulse at start of each half line cycle, the selector switch 730 switches to a position of coupling terminal 734 to the output terminal 738 until a next zero-crossing pulse.

After the first value of the pre-distortion signal is generated at the zero-crossing of the input voltage, all consecutive steps in the line half cycle are generated in a closed loop coupled across selector switch 730, sample and hold unit 740 and through the second buffer 760. In a digital/sampled analog implementation each decrementing step of peak reduction as illustrated in FIG. 5A and 5C is generated through buffer 763 that receives the last step value signal 744 at input 762 of the buffer 763 and multiplies by 1/N, wherein N is the number of steps generated in response to clock 714 at each line cycle (in one example N=32; 32×60=1920 Hz). The 1/N of last peak-step value at output 764 of the buffer 763 goes to negative input of the summer 765 and is deducted from the last peak-step at terminal 766 of the summer 765 and result at 767 is fed back to 734 that through selector switch 730 would be used in the next step of peak calculation. It is appreciated that the example decrementing steps used in this application does not limit other applicable factors in implementation.

Figure 8:
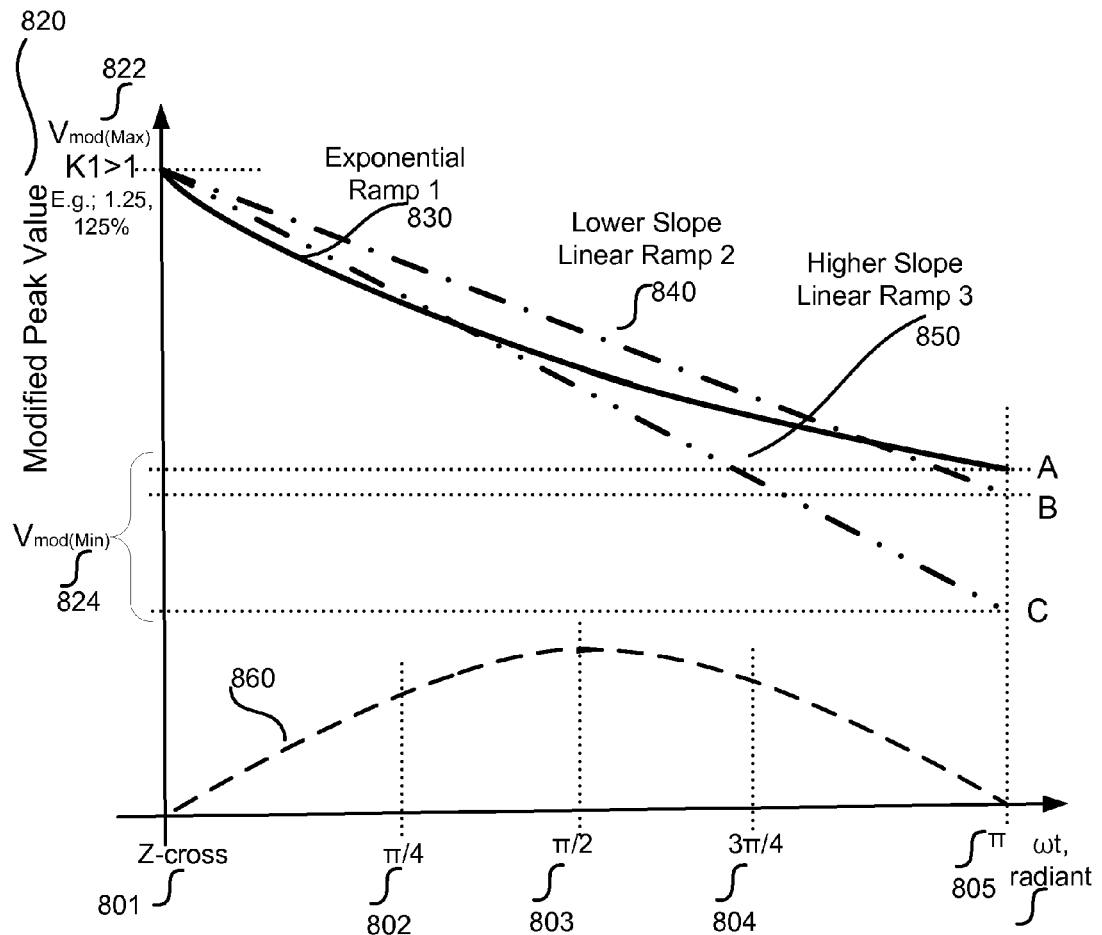
FIG. 8 shows three optional ramp functions that may be used for determining the variable multiplication factor during each half-line cycle, in accordance with some embodiments of the invention.

FIG. 8 shows three optional ramp functions that may be used for determining the variable multiplication factor during each half-line cycle. It is assumed that at an initial point of zero-crossing the sensed peak from the last line cycle is raised up by multiplying it to a fixed factor of K1>1 (in one example K1=1.25; 125%).

Three optional functions of sloped down (decrementing) ramps are illustrated in FIG. 8. They all start from the same point (K1*$V_{pk}$). The Ramp 1 830 which has an exponential nature starts at zero cross 801 of each line half-cycle 860 from a maximum value of K1*$V_{pk}$ 822 (1.25 $V_{pk}$; 125% $V_{pk}$) which is extracted from the last line cycle peak value sensed and at each clock cycle step of the sample-and-hold block in a closed loop multiplies its last step value by a factor (N−1)/N wherein N is the number of clock cycles in each line cycle, such that after "n" cycles we have a total multiplication of $((N-1)/N)^n$ This ramp 1, 830 shows a sharper falling slope (deeper curve) at the start, but the slope reduces towards the end of line half-cycle 860 and at the end of line half-cycle 805 (ωt=π) the total drop is less than other ramps with linear slopes.

The lower slope Ramp 2, 840 which has a linear falling slope starts at zero-crossing 801 of each line half-cycle 860 from a maximum value of K1*$V_{pk}$ 822 (eg, 1.25 $V_{pk}$; 125% $V_{pk}$) which is extracted from the last line cycle peak value sensed and at each clock cycle step of the sample-and-hold block in a closed loop constantly is stepped down by 1/N of the initial value (wherein N is the number of clock cycles in each line cycle).

The higher slope Ramp 3, 850 which has a linear falling slope starts at zero-crossing 801 of each line half-cycle 860 from a maximum value of K1*$V_{pk}$ 822 (eg; 1.25 $V_{pk}$; 125% $V_{pk}$) which is extracted from the last line cycle peak value sensed. However, a main difference is that it operates in a "peak voltage follower mode" which means if the peak detector puts out a signal that changes during the line cycle then the PF Enhancer will follow that variation. In other words as opposed to Ramp 1 and Ramp 2, that are just operating on the sampled initial value of the peak at the beginning of the line cycle, the "peak voltage follower mode" adds a function to the peak detector output that operates based on "modulated (instantaneous) peak value" at each clock cycle and follows the modulated (instantaneous) peak value during the line cycle.

The slope of Ramp 3 is defined in one example by multiplying the initial peak value in one example by 0.25, and decrement this by a fixed number (eg; 1/32 fraction of the initial peak) but add this new sloping down function to the "modulated (instantaneous) peak value".

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A controller for use in a power factor correction (PFC) converter, the controller comprising:
   a power factor enhancer coupled to generate a pre-distortion signal each half-line cycle of an input voltage of the PFC converter;
   an on-time controller configured to generate a first signal to end an on-time of a switch of the PFC converter, wherein the first signal is generated in response to a sensed input current of the PFC converter multiplied by the pre-distortion signal;
   a switching signal generator coupled to the on-time controller and configured to control an input current waveform of the PFC converter to substantially follow a shape of an input voltage waveform of the PFC converter by generating a switching signal in response to the first signal to control switching of the switch, wherein the power factor enhancer adjusts the pre-distortion signal to pre-distort the sensed input current to compensate for distortion in the input current waveform; and
   an input voltage detector coupled to the power factor enhancer to generate an input voltage signal that is representative of a value of the input voltage of the PFC converter, wherein the pre-distortion signal is representative of the value of the input voltage multiplied by a variable multiplication factor, and wherein the power factor enhancer adjusts the multiplication factor to pre-distort the sensed input current,
   wherein the power factor enhancer adjusts the variable multiplication factor to be greater than one for a first part of a half-line cycle of the input voltage and less than one for a second part of the half-line cycle to pre-distort the sensed input current.

2. The controller of claim 1, wherein the power factor enhancer adjusts the variable multiplication factor to be greater than one for a first half of the half-line cycle and less than one for a second half of the half-line cycle.

3. The controller of claim 1, wherein the variable multiplication factor linearly decreases from the value greater than one to the value less than one during each half-line cycle of the input voltage.

4. The controller of claim 1, wherein the variable multiplication factor non-linearly decreases from the value greater than one to the value less than one during each half-line cycle of the input voltage.

5. The controller of claim 1, wherein the variable multiplication factor exponentially decreases from the value greater than one to the value less than one during each half-line cycle of the input voltage.

6. The controller of claim 1, wherein the variable multiplication factor decreases according to a stepwise function from the value greater than one to the value less than one during each half-line cycle of the input voltage.

7. The controller of claim 1, wherein the value of the input voltage is a peak value of the input voltage of the PFC converter.

8. The controller of claim 1, wherein the power factor enhancer comprises:
   a first buffer coupled to apply a first gain greater than one to the input voltage signal to generate an amplified input voltage signal;
   a sample and hold circuit coupled to the first buffer to sample the amplified input voltage signal in response to a zero-crossing of the input voltage to generate a first value of the pre-distortion signal; and
   a second buffer coupled to apply a second gain less than one to the first value of the pre-distortion signal, wherein the sample and hold circuit is further coupled to sample an output of the second buffer to generate a second value of the pre-distortion signal.

9. The controller of claim 1, wherein the on-time controller comprises a first comparator coupled to generate the first signal in response to comparing an error voltage signal that is representative of a load at an output of the PFC converter with a first reference voltage that is generated in response to the sensed input current multiplied by the pre-distortion signal.

10. The controller of claim 9, further comprising:
a current source coupled to generate a first current that is proportional to the sensed input current multiplied by the pre-distortion signal; and
a first capacitor coupled to be charged with the first current when the switch is on, wherein a voltage across the capacitor is the first reference voltage.

11. The controller of claim 9, further comprising an off-time controller configured to generate a second signal to end an off-time of the switch, wherein the off-time controller includes a second comparator coupled to generate the second signal in response to comparing an adjusted error voltage signal with a second voltage reference.

12. The controller of claim 1, wherein the switching signal generator is configured to generate the switching signal to regulate an output of the PFC converter.

13. A power factor correction (PFC) converter, comprising:
an energy transfer element to be coupled to receive an input voltage;
a switch coupled to the energy transfer element to control a transfer of energy through the energy transfer element; and
a controller coupled to control switching of the switch, the controller comprising:
a power factor enhancer coupled to generate a pre-distortion signal each half-line cycle of the input voltage;
an on-time controller configured to generate a first signal to end an on-time of the switch, wherein the first signal is generated in response to a sensed input current of the PFC converter multiplied by the pre-distortion signal;
a switching signal generator coupled to the on-time controller and configured to control an input current waveform of the PFC converter to substantially follow a shape of an input voltage waveform of the PFC converter by generating a switching signal in response to the first signal to control switching of the switch, wherein the power factor enhancer adjusts the pre-distortion signal to pre-distort the sensed input current to compensate for distortion in the input current waveform; and
an input voltage detector coupled to the power factor enhancer to generate an input voltage signal that is representative of a value of the input voltage of the PFC converter, wherein the pre-distortion signal is representative of the value of the input voltage multiplied by a variable multiplication factor, and wherein the power factor enhancer adjusts the multiplication factor to pre-distort the sensed input current,
wherein the power factor enhancer adjusts the variable multiplication factor to be greater than one for a first part of a half-line cycle of the input voltage and less than one for a second part of the half-line cycle to pre-distort the sensed input current.

14. The PFC converter of claim 13, wherein the power factor enhancer adjusts the variable multiplication factor to be greater than one for a first half of the half-line cycle and less than one for a second half of the half-line cycle.

15. The PFC converter of claim 13, wherein the variable multiplication factor linearly decreases from the value greater than one to the value less than one during each half-line cycle of the input voltage.

16. The PFC converter of claim 13, wherein the variable multiplication factor non-linearly decreases from the value greater than one to the value less than one during each half-line cycle of the input voltage.

17. The PFC converter of claim 13, wherein the variable multiplication factor exponentially decreases from the value greater than one to the value less than one during each half-line cycle of the input voltage.

18. The PFC converter of claim 13, wherein the variable multiplication factor decreases according to a stepwise function from the value greater than one to the value less than one during each half-line cycle of the input voltage.

19. The PFC converter of claim 13, wherein the value of the input voltage is a peak value of the input voltage of the PFC converter.

20. The PFC converter of claim 13, wherein the power factor enhancer comprises:
a first buffer coupled to apply a first gain greater than one to the input voltage signal to generate an amplified input voltage signal;
a sample and hold circuit coupled to the first buffer to sample the amplified input voltage signal in response a zero-crossing of the input voltage to generate a first value of the pre-distortion signal; and
a second buffer coupled to apply a second gain less than one to the first value of the pre-distortion signal, wherein the sample and hold circuit is further coupled to sample an output of the second buffer to generate a second value of the pre-distortion signal.

21. The PFC converter of claim 13, wherein the on-time controller comprises a first comparator coupled to generate the first signal in response to comparing an error voltage signal that is representative of a load at an output of the PFC converter with a first reference voltage that is generated in response to the sense input current multiplied by the pre-distortion signal.

22. The PFC converter of claim 21, wherein the controller further comprises:
a current source coupled to generate a first current that is proportional to the sensed input current multiplied by the pre-distortion signal; and
a first capacitor coupled to be charged with the first current when the switch is on, wherein a voltage across the capacitor is the first reference voltage.

23. The PFC converter of claim 21, wherein the controller further comprises an off-time controller configured to generate a second signal to end an off-time of the switch, wherein the off-time controller includes a second comparator coupled to generate the second signal in response to comparing an adjusted error voltage signal with a second voltage reference.

24. The PFC converter of claim 13, wherein the switching signal generator is configured to generate the switching signal to regulate an output of the PFC converter.

25. The PFC converter of claim 13, wherein the switch and the controller are included together in an integrated circuit.

* * * * *